(No Model.)
C. W. BEALL.
FUNNEL.
No. 529,998. Patented Nov. 27, 1894.
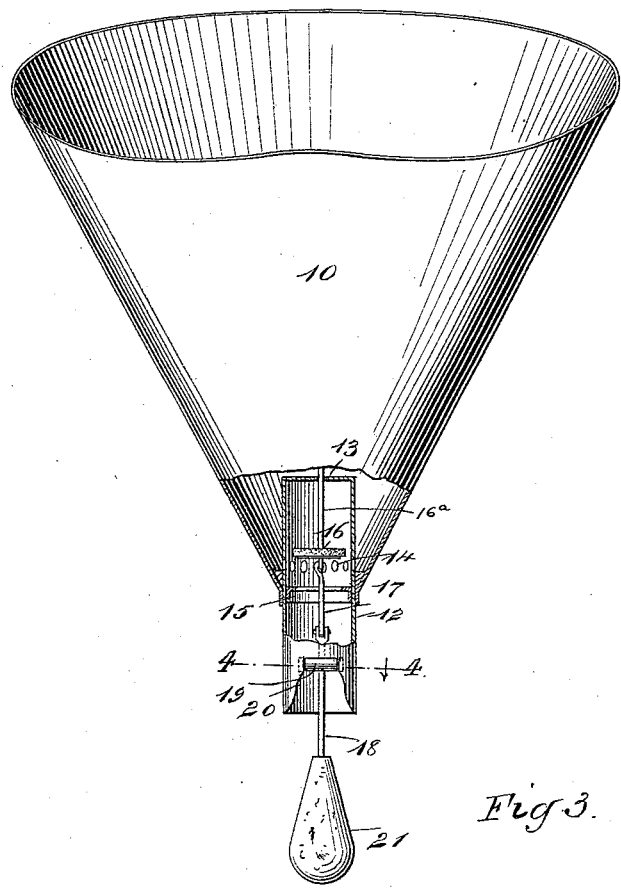
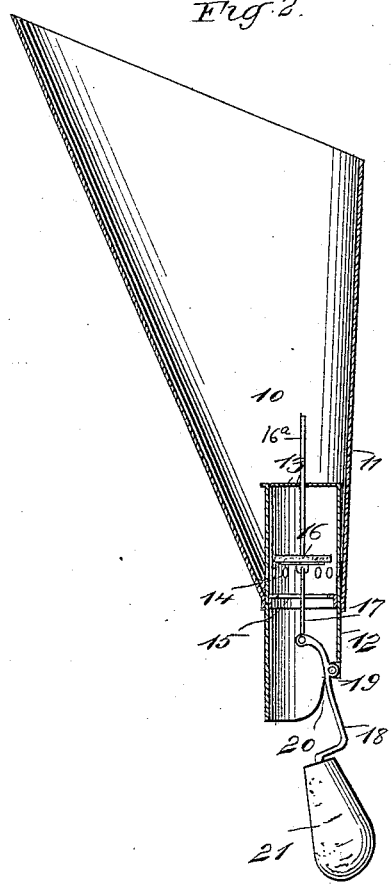
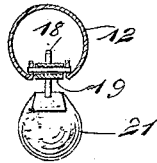
WITNESSES:
Paul Johns
W. B. Hutchinson
INVENTOR
C. W. Beall
BY
Munn & Co
ATTORNEYS.

UNITED STATES PATENT OFFICE.

CHARLES W. BEALL, OF SARATOGA, WYOMING.

FUNNEL.

SPECIFICATION forming part of Letters Patent No. 529,998, dated November 27, 1894.

Application filed June 15, 1894. Serial No. 514,645. (No model.)

*To all whom it may concern:*

Be it known that I, CHARLES W. BEALL, of Saratoga, in the county of Carbon and State of Wyoming, have invented a new and Improved Funnel, of which the following is a full, clear, and exact description.

My invention relates to improvements in that class of funnels which are adapted to close automatically when the vessel which is being filled is full.

The object of my invention is to produce a simple funnel, which is particularly adapted for filling lamps having opaque sides, but which may be used for filling any other receptacle, and which, when the said receptacle becomes nearly full, closes automatically so as to prevent running over the said receptacle and spilling the liquid.

To these ends my invention consists of a funnel, the construction of which will be hereinafter described and claimed.

Reference is to be had to the accompanying drawings, forming a part of this specification, in which similar figures of reference indicate corresponding parts in all the views.

Figure 1 is a broken side elevation of the funnel embodying my invention. Fig. 2 is a central vertical section of the same with the valve of the funnel open. Fig. 3 is a broken vertical section with the valve closed; and Fig. 4 is a sectional plan on the line 4—4 of Fig. 1.

The funnel has the usual tapering upper portion 10, except that this portion is preferably flattened on one side 11, as shown best in Figs. 2 and 3, to adapt it for filling a lamp and to enable it to be placed close to the burner and held in a vertical position so as to readily enter the inlet opening of a lamp.

The funnel has, at its lower end, a discharge spout 12 which projects upward into the funnel and is closed at the top, as shown at 13, while in its sides, near the bottom, are holes 14 through which liquid from the funnel may run. Just below the holes 14 is a circular rim 15 which serves as a valve seat and against which the valve 16 closes, this valve being preferably of felt, although it may be of any material suitable for the purpose, and it will be seen that when the valve is closed down against the seat 15, nothing can run from the funnel, but when the valve is raised above the holes 14 the liquid in the funnel may run freely out through the holes and the spout. The valve is guided by a rod $16^a$ which slides in the top 13 of the spout 12. The valve 16 connects by a link 17 with one end of a bent lever 18, which is fulcrumed, as shown at 19, on one side and near the lower end of the spout 12, the spout being cut away at this point, as shown at 20, to provide for the free movement of the lever. The lever has at its lower or outer end a float 21, which may be made of cork or of any suitable material.

When the funnel is used, the spout 12 is inserted in the receptacle to be filled and the float 21 hangs down, as shown in Fig. 2, and the liquid is poured into the funnel in the usual way. The liquid runs down through the holes 14 and spout 12 and, when the vessel is nearly full, the liquid therein raises the float 21 which swings the lever 18 and pulls down the link 17 and valve 16 to the position shown in Fig. 3, thus closing the funnel. The funnel is then raised from the vessel and the float drops, thus raising the valve 16 so that the remaining liquid in the funnel flows out into the receptacle which is being filled.

The float and funnel are gaged in such a way that the funnel will be closed before the vessel is quite full, and thus there will be sufficient space in the vessel to receive the contents of the funnel after it has been closed in the manner described.

Having thus described my invention, I claim as new and desire to secure by Letters Patent—

1. The combination of a funnel having an outlet, a float carrying lever, a rod connected at one end to said lever and a valve controlling the funnel outlet, said valve being connected directly to and supported by the said rod, substantially as and for the purpose set forth.

2. The combination, with the funnel, having a suitable discharge pipe closed at the top and provided with side openings, of the valve seat beneath the side openings, a valve arranged to move up and down above the seat, a float suspended from the lower end of the spout, and means for positively actuating the valve in both directions by the movement of the float, substantially as described.

3. The combination, with the funnel having a discharge spout closed at the top and provided with side openings, of the seat in the funnel spout below the openings, a lever fulcrumed below the seat, a valve an operative connection between the lever and valve, and a float on the free end of the lever, substantially as described.

4. A funnel provided with an outlet, a valve controlling such outlet, a lever pivoted to the funnel and connected at one end with the valve and arranged to be turned approximately into line with the outlet or out at an angle to and to a point at one side of such outlet and a float on the said lever, all substantially as and for the purposes set forth.

CHARLES W. BEALL.

Witnesses:
ARTHUR R. COUZENS,
JOSEPH B. HASSETT.